No. 735,012. Patented July 28, 1903.

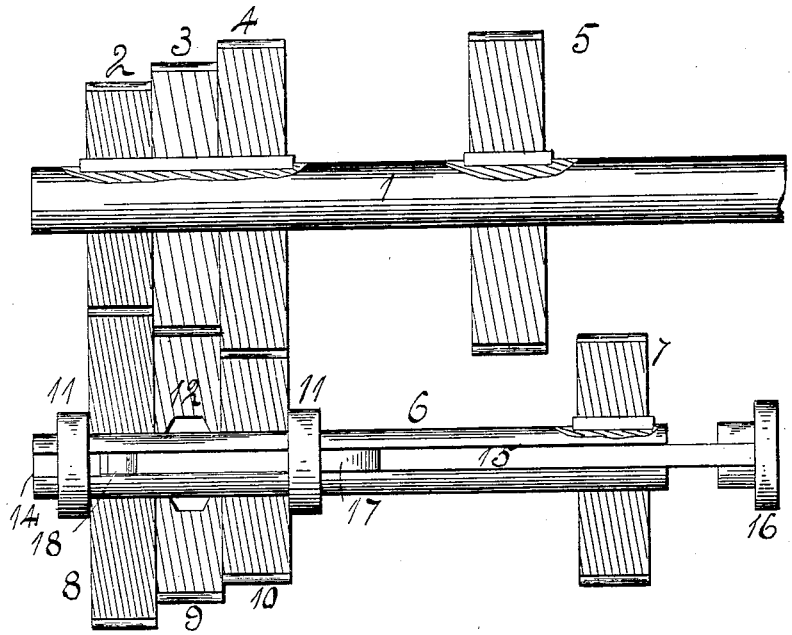
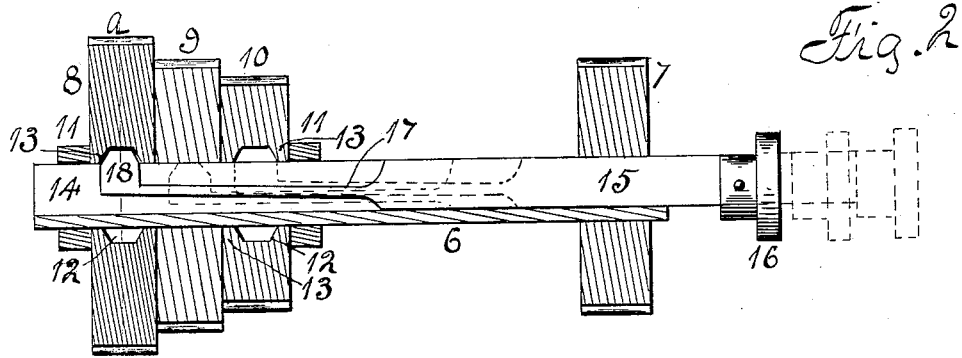
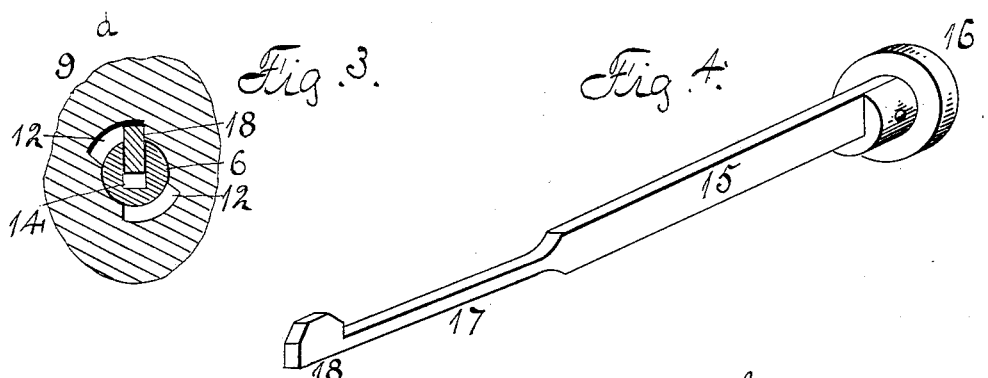

UNITED STATES PATENT OFFICE.

WILLIAM F. BARNES, OF ROCKFORD, ILLINOIS, ASSIGNOR TO W. F. & JOHN BARNES COMPANY, OF ROCKFORD, ILLINOIS, A CORPORATION OF ILLINOIS.

SPEED-CHANGING MECHANISM.

SPECIFICATION forming part of Letters Patent No. 735,012, dated July 28, 1903.

Application filed December 31, 1902. Serial No. 137,227. (No model.)

*To all whom it may concern:*

Be it known that I, WILLIAM F. BARNES, a citizen of the United States, residing at Rockford, in the county of Winnebago and State of Illinois, have invented certain new and useful Improvements in Speed-Changing Mechanism, of which the following is a specification.

The object of this invention is to form a positive connection between a driven shaft or other power-transmitting device and its driver while the driver is in motion and to change the speed of the driven shaft without stopping the driver.

In the accompanying drawings, Figure 1 is a section of the driver and driven shafts, showing their connections. Fig. 2 is a section of the driven shaft. Fig. 3 is a section on dotted line a, Fig. 2. Fig. 4 is an isometrical representation of the sliding key.

In this instance the driver comprises a shaft to which are keyed the toothed wheels 2, 3, 4, and 5, so that all revolve together. The driven shaft 6 has a toothed wheel 7 keyed thereto near one end. Upon the shaft are located wheels 8, 9, and 10, independent of each other and all independent of the shaft and in this instance held in place by the collars 11. In this instance all of the toothed wheels 8, 9, and 10 have two recesses 12 formed in their inner faces.

The shaft 6 has a lengthwise groove 14. A key (shown at Fig. 4) is located in the groove in the shaft and comprises the main portion 15, having the knob 16 secured to it. The other end of the main portion is reduced in width, forming a spring 17, having its free end 18 enlarged, and the corners of the enlargement are beveled. The toothed wheels 8, 9, and 10 are constantly revolved by the toothed wheels 2, 3, and 4 and turn loosely on the shaft. The shaft remains still until a connection is formed between some one of the toothed wheels 8, 9, and 10 and the shaft. This is accomplished by moving the key in the groove of the shaft 6 until the enlarged end 18 enters a recess 12 in one of the toothed wheels, and as the toothed wheel revolves the side of the recess will come in contact with the enlarged end of the key, thereby forming a connection between the wheel and shaft. The key can be so moved as to bring the enlarged end into engagement with any one of the toothed wheels 8, 9, and 10. By beveling the ends of the enlarged portion of the key the key can be easily moved into and out of engagement with the toothed wheels. In moving the key out of engagement with one of the toothed wheels into engagement with one of the other toothed wheels the enlarged end of the key will be depressed against the spring action sufficiently to permit it to pass under the outer edges 13 of the toothed wheels. The shaft 6 will remain stationary while the key rests against the outer edges 13 of the toothed wheels.

My improved key can be used to form a connection between a shaft and a pulley or toothed wheel loosely mounted on the shaft or can be used to change the speed of the shaft or can drive another mechanism at different speeds.

I claim as my invention—

In a speed-changing mechanism, the combination of a shaft having a lengthwise groove, a revoluble member located on the shaft having an internal recess communicating with its bore, and a key movable in the groove independent of the shaft and having a main portion, an enlarged end and a center reduced spring-section, by means of which the enlarged end can be moved into and out of engagement with the revoluble member.

WILLIAM F. BARNES.

Witnesses:
JOHN BARNES,
A. O. BEHEL.